(12) United States Patent
Chen et al.

(10) Patent No.: US 11,265,466 B2
(45) Date of Patent: Mar. 1, 2022

(54) ELECTRONIC DEVICE WITH IMAGE-CAPTURING FUNCTION

(71) Applicant: Wistron Corp., New Taipei (TW)

(72) Inventors: Cheng Hung Chen, New Taipei (TW); Cheng-Wei Chang, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days.

(21) Appl. No.: 16/792,836

(22) Filed: Feb. 17, 2020

(65) Prior Publication Data
US 2021/0105407 A1   Apr. 8, 2021

(30) Foreign Application Priority Data
Oct. 4, 2019   (TW) .................. 108135977

(51) Int. Cl.
*H04N 5/232* (2006.01)
*H04N 5/225* (2006.01)
*G06F 1/16* (2006.01)
*G06F 21/83* (2013.01)
*H04R 1/04* (2006.01)

(52) U.S. Cl.
CPC ....... *H04N 5/23245* (2013.01); *G06F 1/1686* (2013.01); *G06F 21/83* (2013.01); *H04N 5/2252* (2013.01); *H04R 1/04* (2013.01); *H04R 2499/15* (2013.01)

(58) Field of Classification Search
CPC .................................................. H04N 5/23245
USPC ........................................................ 348/373
See application file for complete search history.

(56) References Cited

U.S. PATENT DOCUMENTS 10,142,525 B2 * 11/2018 Tachikawa .......... H04N 5/23241
2019/0215426 A1 * 7/2019 Ko ........................ G06F 1/1616

FOREIGN PATENT DOCUMENTS

TW    201930998 A    8/2019

OTHER PUBLICATIONS

Lenovo, May 2018, https://download.lenovo.com/consumer/desktop_pub/ideacentre_520-27_hmm_20180614.pdf.*

* cited by examiner

*Primary Examiner* — Joel W Fosselman

(57) ABSTRACT

An electronic device with image-capturing functionality is provided. The electronic device includes a device housing, a module substrate, an image-capturing element, a switch unit and a control unit. The module substrate is adapted to be slid between a first substrate position and a second substrate position. The image-capturing element is disposed on the module substrate. The control unit is coupled to the image-capturing element and the switch unit. When the module substrate is in the first substrate position, the switch unit is activated, the switch unit sends a pressed signal, and the control unit deactivates the image-capturing element according to the pressed signal. When the module substrate is in the second substrate position, the switch unit is not activated, and the control unit activates the image-capturing element. The electronic device of the embodiment protects the privacy of the user.

14 Claims, 11 Drawing Sheets

ELECTRONIC DEVICE WITH IMAGE-CAPTURING FUNCTION

CROSS REFERENCE TO RELATED APPLICATIONS

This Application claims priority of Taiwan Patent Application No. 108135977, filed on Oct. 4, 2019, the entirety of which is incorporated by reference herein.

BACKGROUND OF THE INVENTION

Field of the Invention

The present invention relates to an electronic device, and in particular to an electronic device with image-capturing functionality.

Description of the Related Art

A conventional electronic device with an image-capturing function, such as a notebook computer, has a microphone and an image-capturing element. If the notebook computer is hacked, the hacker can easily activate the microphone and the image-capturing element without the user being aware. Therefore, the hacker may see and hear the user without his knowledge, and the privacy of the user is thereby compromised.

BRIEF SUMMARY OF THE INVENTION

In one embodiment, an electronic device with image-capturing functionality is provided. The electronic device includes a device housing, a module substrate, an image-capturing element, a switch unit and a control unit. The housing comprises a housing opening. The module substrate is slidably disposed in the device housing, wherein the module substrate is adapted to be slid between a first substrate position and a second substrate position. The image-capturing element is disposed on the module substrate. The control unit is coupled to the image-capturing element and the switch unit, wherein when the module substrate is in the first substrate position, the switch unit is activated, the switch unit sends a pressed signal, and the control unit deactivates the image-capturing element according to the pressed signal, and when the module substrate is in the second substrate position, the switch unit is not activated, and the control unit activates the image-capturing element.

In one embodiment, the electronic device further comprises a microphone, wherein the microphone is disposed on the module substrate, the microphone is coupled to the control unit, and when the module substrate is in the first substrate position, the switch unit is activated, the switch unit sends the pressed signal, and the control unit deactivates the microphone according to the pressed signal, and when the module substrate is in the second substrate position, the switch unit is not activated, and the control unit activates the microphone.

In one embodiment, when the module substrate is in the first substrate position, the image-capturing element is not aligned with the housing opening, and the image-capturing element is covered by the device housing, and when the module substrate is in the second substrate position, the image-capturing element is aligned with the housing opening and is capable of capturing an image.

In one embodiment, the module substrate comprises a first recognition label, and when the module substrate is in the first substrate position, the first recognition label is aligned with the housing opening.

In one embodiment, when the module substrate is moved to a third substrate position between the first substrate position and the second substrate position, the switch unit is not activated, the control unit activates the image-capturing element and the microphone, and the image-capturing element is not aligned with the housing opening and is covered by the device housing.

In one embodiment, the module substrate comprises a second recognition label, and when the module substrate is in the third substrate position, the second recognition label is aligned with the housing opening.

In one embodiment, the electronic device further comprises a bracket, wherein the module substrate is disposed on the bracket, when the module substrate is in the first substrate position, the switch unit is activated by the bracket, and when the module substrate is in the second substrate position or the third substrate position, the switch unit is not activated by the bracket.

In one embodiment, the electronic device further comprises a restriction unit, wherein the restriction unit comprises a first restriction slot and a second restriction slot, the restriction unit is disposed on the device housing, the bracket comprises a positioning hook, and when the module substrate is in the third substrate position, the positioning hook wedges the first restriction slot, and when the module substrate is in the second substrate position, the positioning hook wedges the second restriction slot.

In one embodiment, the electronic device further comprises a device magnetic element and an elastic element, wherein the restriction unit comprises a unit magnetic element, the elastic element is disposed on the device housing to exert an elastic force on the bracket, the device housing comprises a housing groove, the restriction unit is disposed in the housing groove and is adapted to be moved between a first unit position and a second unit position, and when the restriction unit is in the first unit position, the positioning hook is adapted to wedge into the first restriction slot and the second restriction slot, and when the device magnetic element nears the restriction unit, the device magnetic element attracts the unit magnetic element to move the restriction unit to the second unit position, the first restriction slot and the second restriction slot are adapted to be separated from the positioning hook, and the elastic force pushes the module substrate into the first substrate position.

In one embodiment, the module substrate is moved between the first substrate positon and the second substrate position in a first direction, the restriction unit is moved between the first unit position and the second unit position in a second direction, and the first direction is perpendicular to the second direction.

In one embodiment, the bracket comprises at least one elastic arm, the device housing comprises a track, and the elastic arm abuts the track.

In one embodiment, the electronic device further comprises a first device member and a second device member, the first device member comprises a display and the device housing, the second device member comprises an input interface and the device magnetic element, and when the first device member overlaps the second device member, the device magnetic element is adjacent to the restriction unit.

Utilizing the electronic device of the first embodiment of the invention, when the module substrate is in the first substrate position (first state), the image-capturing element and the microphone are deactivated, and the user can identify the state (first state) of the electronic device via the first recognition label. In this state (first state), the image-capturing element and the microphone are deactivated by the switch unit, and therefore the image-capturing element and the microphone cannot be activated by malware. When the module substrate is in the third substrate position (third state), the image-capturing element and the microphone are activated, the image-capturing element is covered by the device housing, and only the microphone can receive sound. The user can identify the state (third state) of the electronic device via the second recognition label. When the module substrate is in the second substrate position (second state), the image-capturing element and the microphone are activated, the image-capturing element is aligned with the housing opening, the image-capturing element can catch image, and the microphone can receive sound. Therefore, the electronic device of the embodiment of the invention can prevent the image and sound from being leaked maliciously, and protect the privacy of the user.

In one embodiment, an electronic device with an image-capturing function is provided. The electronic device includes a device housing, a module body, an image-capturing element, a microphone, a switch unit and a control unit. The module body is rotatably disposed on the device housing, wherein the module substrate is adapted to be rotated between a first body orientation, a second body orientation and a third body orientation. The image-capturing element is disposed on the module body. The microphone is disposed on the module body. The switch unit is adapted to be pressed by the module body. The control unit is coupled to the image-capturing element, the microphone and the switch unit, wherein when the module body is in the first body orientation, the switch unit is activated, the switch unit sends a pressed signal, and the control unit deactivates the image-capturing element and the microphone according to the pressed signal, and when the module body is in the second body orientation, the switch unit is not activated, the control unit activates the image-capturing element and the microphone, and the image-capturing element is covered by the device housing, and when the module body is in the third body orientation, the switch unit is not activated, the control unit activates the image-capturing element and the microphone, and the image-capturing element is capable of capturing an image.

In one embodiment, the module body comprises a cam, the cam is adapted to abut the switch unit, and when the module body is in the first body orientation, the cam activates the switch unit, and when the module body is in the second body orientation or the third body orientation, the cam does not activate the switch unit.

In one embodiment, the electronic device further comprises a display, wherein the device housing comprises a first housing side and a second housing side, the display is disposed on the second housing side, and when the module body is in the first body orientation, the image-capturing element is on the first housing side, and when the module body is in the second body orientation, the image-capturing element faces the device housing, and when the module body is in the third body orientation, the image-capturing element is on the second housing side.

Utilizing the electronic device of the second embodiment of the invention, when the module body is in the first body orientation (first state), the image-capturing element and the microphone are deactivated, and the user can identify the state (first state) of the electronic device via the orientation of the module body. In this state (first state), the image-capturing element and the microphone are deactivated by the switch unit, and therefore the image-capturing element and the microphone cannot be activated by malware. When the module body is in the second body orientation (second state), the image-capturing element and the microphone are activated, the image-capturing element is covered by the device housing, and only the microphone can receive sound. The user can identify the state (second state) of the electronic device via the orientation of the module body. When the module body is in the third body orientation (third state), the image-capturing element and the microphone are activated, the image-capturing element can catch image, and the microphone can receive sound. Therefore, the electronic device of the embodiment of the invention can prevent the image and sound from being leaked maliciously, and protect the privacy of the user.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
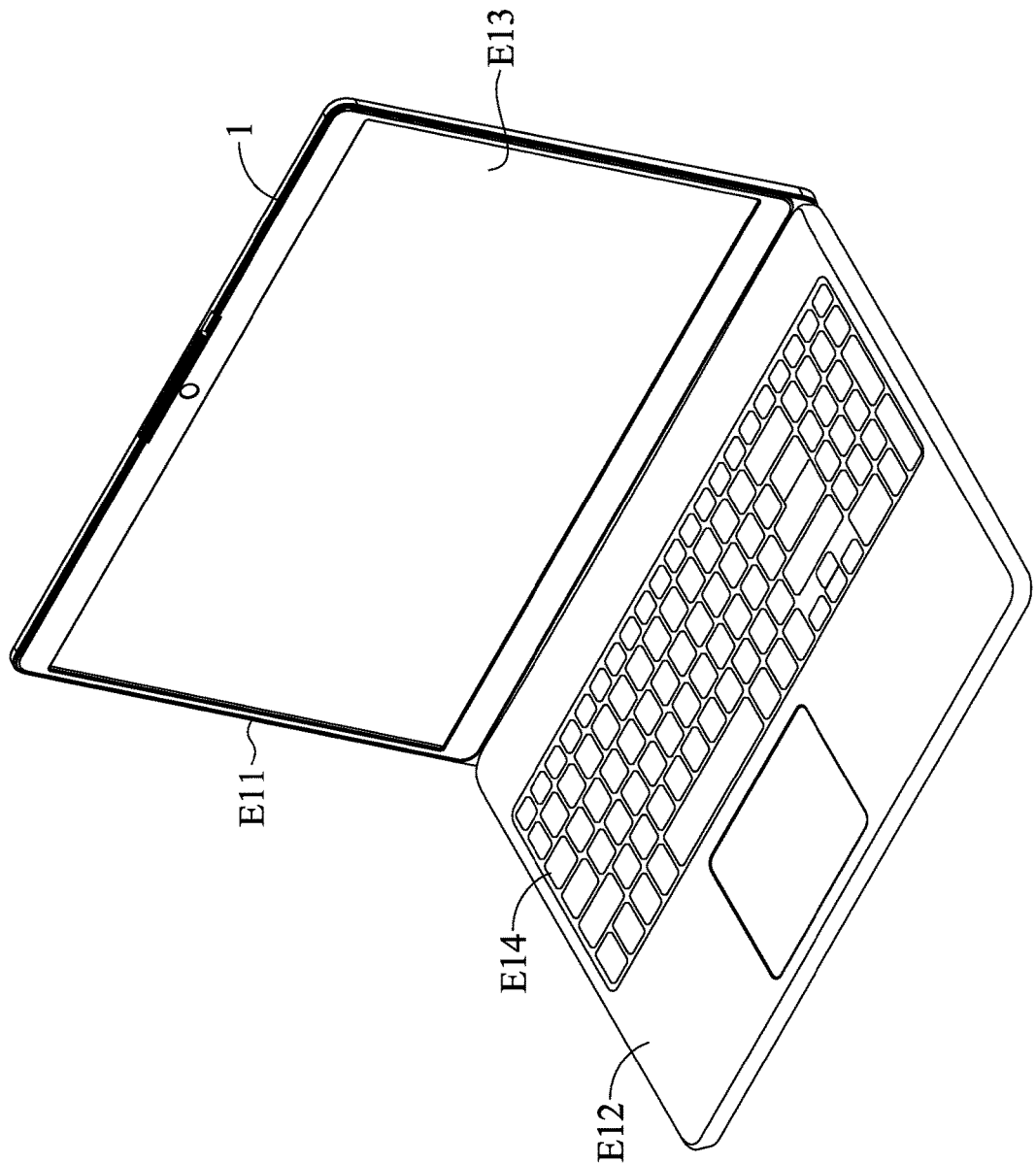
FIG. 1A shows an electronic device with image-capturing functionality of a first embodiment of the invention.
Figure 2A:
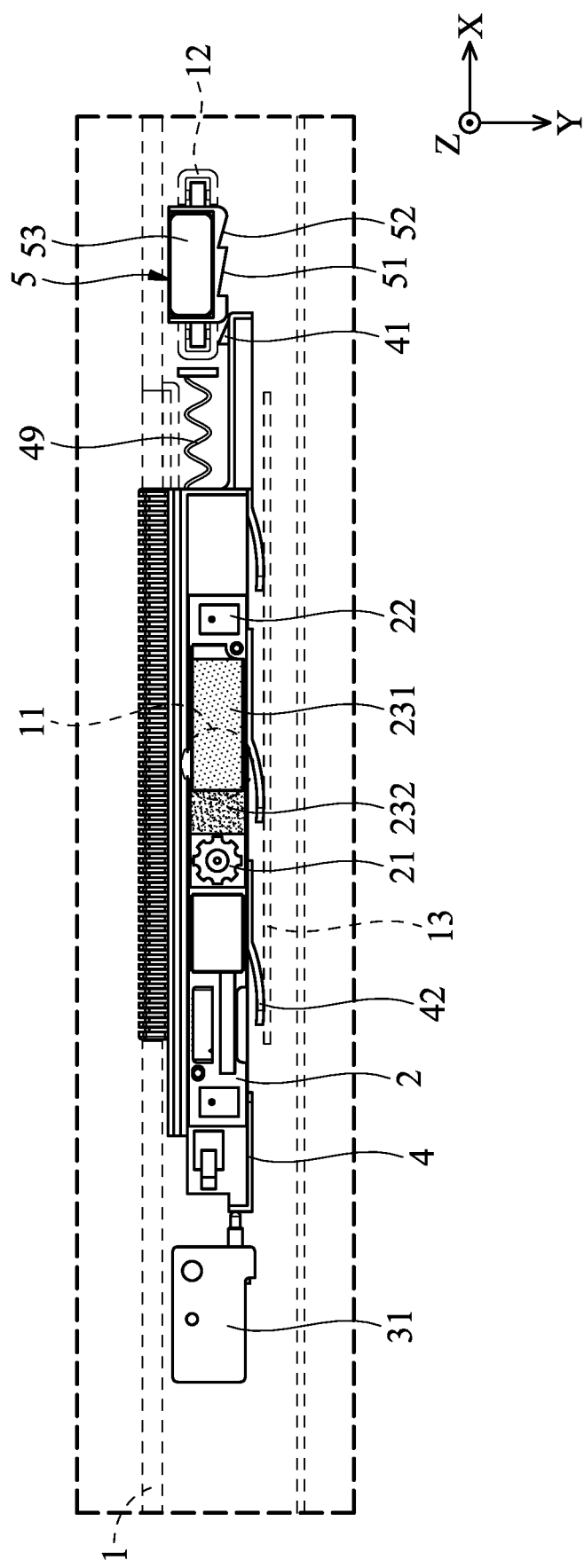
FIG. 2A shows the inner structure of the electronic device of the first embodiment of the invention, wherein a module substrate is in a first substrate position.
Figure 2B:
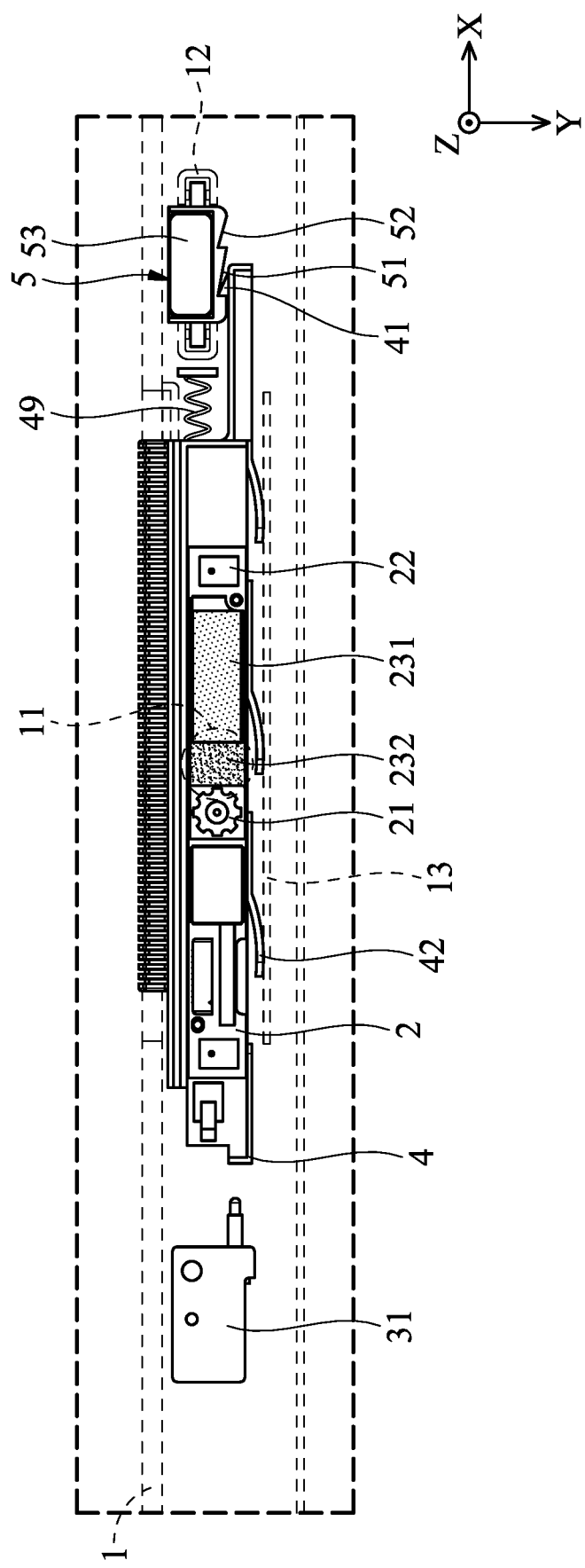
FIG. 2B shows the inner structure of the electronic device of the first embodiment of the invention, wherein the module substrate is in a third substrate position.
Figure 2C:
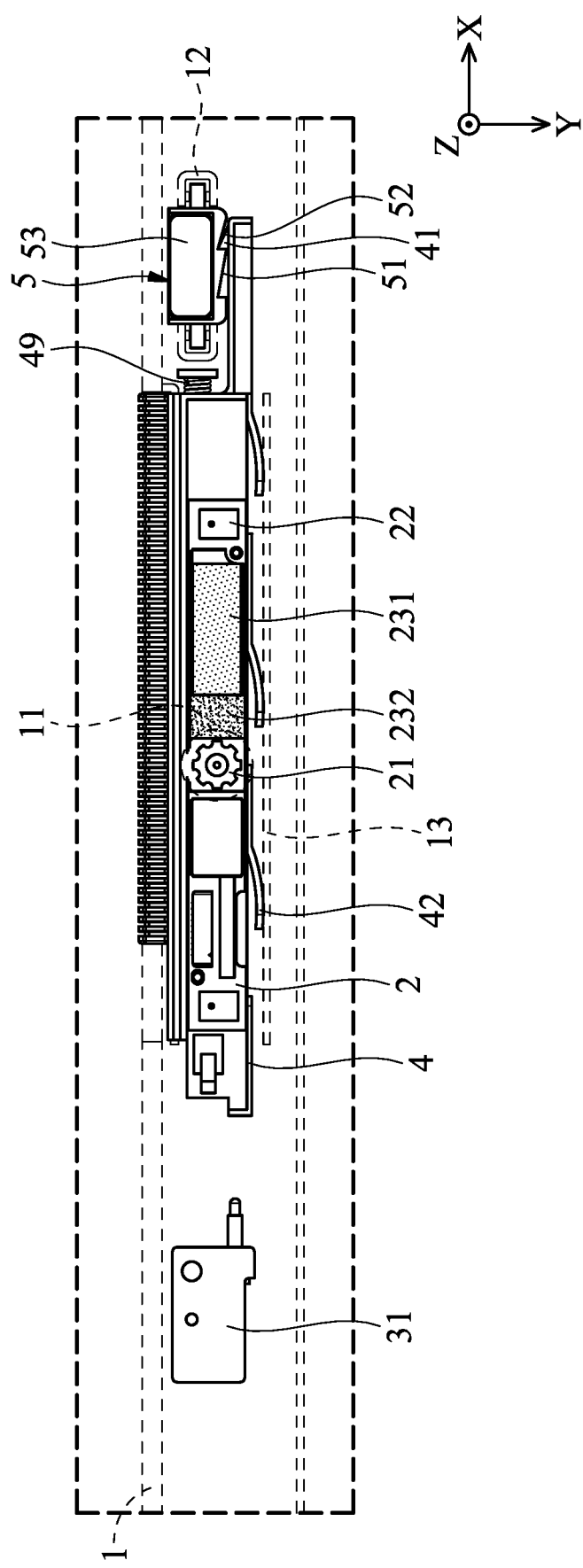
FIG. 2C shows the inner structure of the electronic device of the first embodiment of the invention, wherein the module substrate is in a second substrate position.
Figure 3:
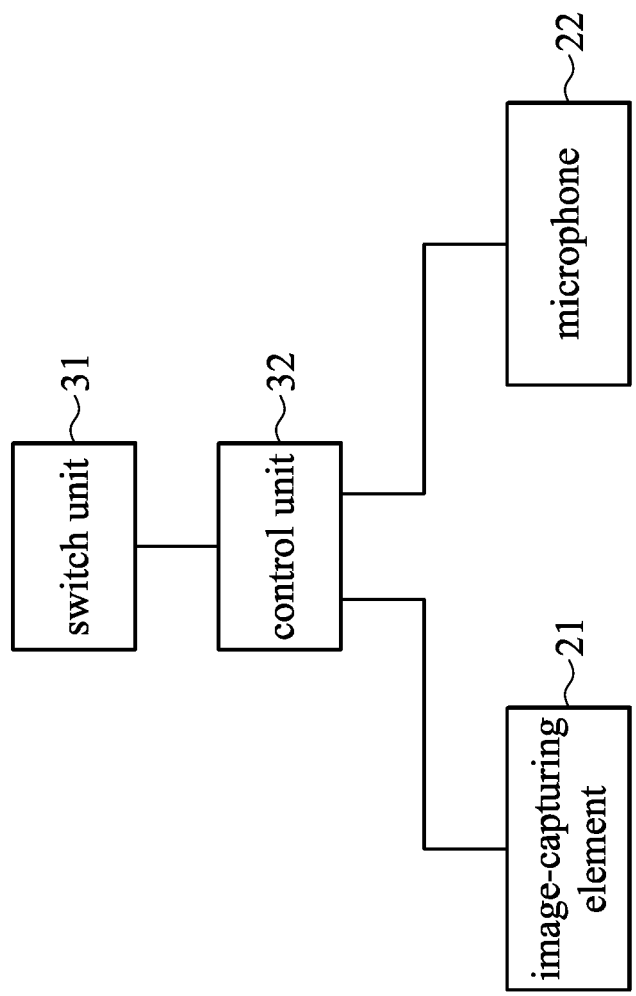
FIG. 3 is a block diagram of the electronic device of the first embodiment of the invention.

FIG. 1A shows an electronic device with image-capturing functionality of a first embodiment of the invention. FIGS. 2A, 2B and 2C show inner structure of the electronic device with an image-capturing function of the first embodiment of the invention. FIG. 3 is a block diagram of the electronic device of the first embodiment of the invention. With reference to FIGS. 1A, 2A, 2C and 3, the electronic device E1 of the first embodiment of the invention includes a device housing 1, a module substrate 2, an image-capturing element 21, a switch unit 31 and a control unit 32. The housing 1 comprises a housing opening 11. The module substrate 2 is slidably disposed in the device housing 1, wherein the module substrate 2 is adapted to be slid between a first substrate position (FIG. 2A) and a second substrate position (FIG. 2C). The image-capturing element 21 is disposed on the module substrate 2. The control unit 32 is coupled to the image-capturing element 21 and the switch unit 31. When the module substrate 2 is in the first substrate position (FIG. 2A), the switch unit 31 is activated, the switch unit 31 sends a pressed signal, and the control unit 32 deactivates the image-capturing element 21 according to the pressed signal. When the module substrate 2 is in the second substrate position (FIG. 2C), the switch unit 31 is not activated, and the control unit 32 activates the image-capturing element 21.

With reference to FIGS. 2A, 2C and 3, in one embodiment, the electronic device E1 further comprises a microphone 22. The microphone 22 is disposed on the module substrate 2. The microphone 22 is coupled to the control unit 32. When the module substrate 2 is in the first substrate position, the switch unit 31 is activated, the switch unit 31 sends the pressed signal, and the control unit 32 deactivates the microphone 22 according to the pressed signal. When the module substrate 2 is in the second substrate position, the switch unit 31 is not activated, and the control unit 32 activates the microphone 22.

With reference to FIGS. 2A and 2C, in one embodiment, when the module substrate 2 is in the first substrate position (FIG. 2A), the image-capturing element 21 is not aligned with the housing opening 11, and the image-capturing element 21 is covered by the device housing 1. When the module substrate 2 is in the second substrate position (FIG. 2C), the image-capturing element 21 is aligned with the housing opening 11 and is capable of capturing an image.

With reference to FIGS. 2A, 2B, 2C and 3, in one embodiment, when the module substrate 2 is moved to a third substrate position between the first substrate position and the second substrate position (FIG. 2B), the switch unit 31 is not activated, the control unit 32 activates the image-capturing element 21 and the microphone 22, and the image-capturing element 21 is not aligned with the housing opening 11 and is covered by the device housing 1.

Figure 1C:
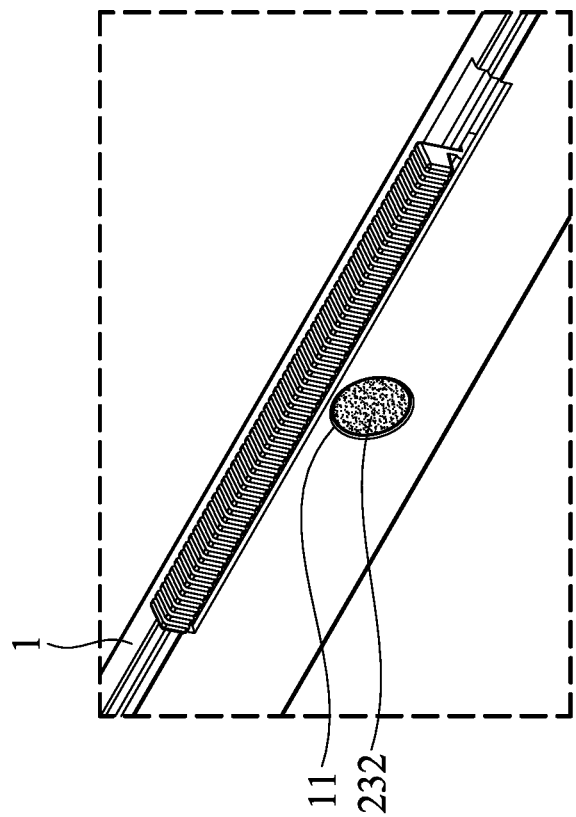
FIG. 1C shows a second recognition label being aligned with the housing opening of the first embodiment of the invention.
Figure 1B:
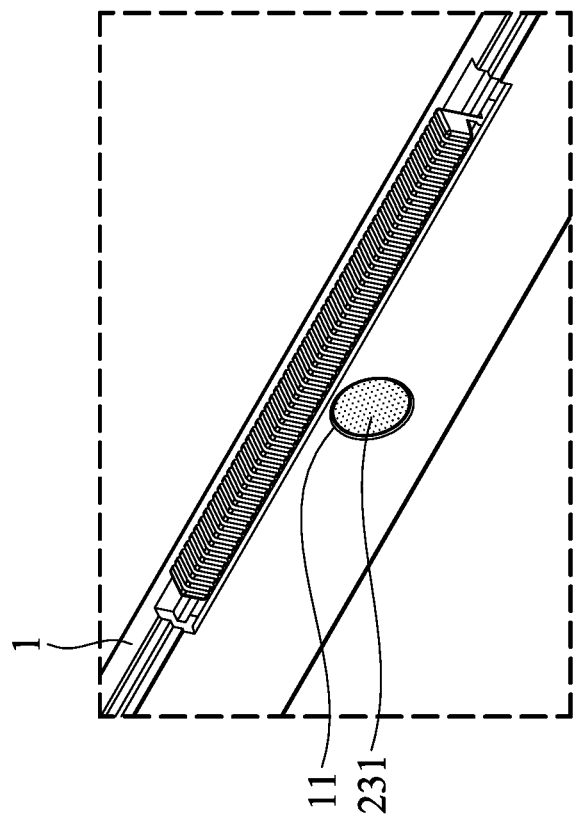
FIG. 1B shows a first recognition label being aligned with the housing opening of the first embodiment of the invention.

With reference to FIGS. 1B and 2A, in one embodiment, the module substrate 2 comprises a first recognition label 231. When the module substrate 2 is in the first substrate position, the first recognition label 231 is aligned with the housing opening 11.

With reference to FIGS. 1C and 2B, in one embodiment, the module substrate 2 comprises a second recognition label 232. When the module substrate 2 is in the third substrate position, the second recognition label 232 is aligned with the housing opening 11.

With reference to FIGS. 2A, 2B and 2C, in one embodiment, the electronic device E1 further comprises a bracket 4. The module substrate 2 is disposed on the bracket 4. When the module substrate 2 is in the first substrate position, the switch unit 31 is activated by the bracket 4. When the module substrate 2 is in the second substrate position or the third substrate position, the switch unit 31 is not activated by the bracket 4.

With reference to FIGS. 2A, 2B and 2C, in one embodiment, the electronic device E1 further comprises a restriction unit 5. The restriction unit 5 comprises a first restriction slot 51 and a second restriction slot 52. The restriction unit 5 is disposed on the device housing 1. The bracket 4 comprises a positioning hook 41. When the module substrate 2 is in the third substrate position (FIG. 2B), the positioning hook 41 wedges the first restriction slot 51. When the module substrate 2 is in the second substrate position (FIG. 2C), the positioning hook 41 wedges the second restriction slot 52.

Figure 4A:
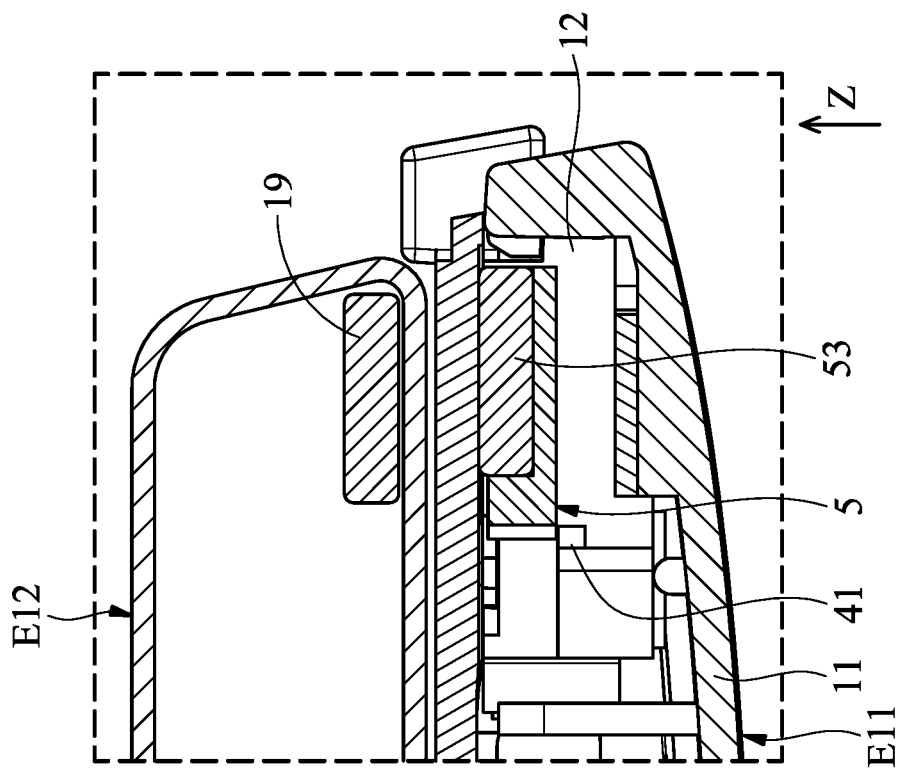
FIG. 4A shows a restriction unit of the first embodiment of the invention in a first unit position.
Figure 4B:
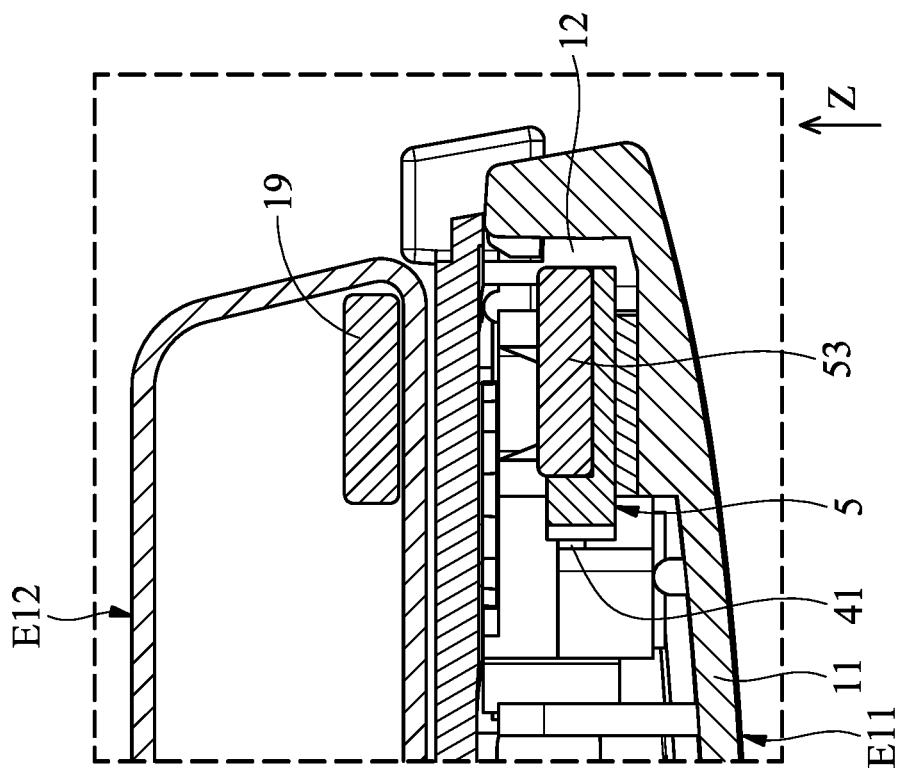
FIG. 4B shows the restriction unit of the first embodiment of the invention in a second unit position.

With reference to FIGS. 2A, 2B, 2C, 4A and 4B, in one embodiment, the electronic device E1 further comprises a device magnetic element 19 and an elastic element 49. The restriction unit 5 comprises a unit magnetic element 53. The elastic element 49 is disposed on the device housing 1 to exert an elastic force on the bracket 4. The device housing 1 comprises a housing groove 12. The restriction unit 5 is disposed in the housing groove 12 and is adapted to be moved between a first unit position (FIG. 4A) and a second unit position (FIG. 4B). When the restriction unit 5 is in the first unit position (FIG. 4A), the positioning hook 41 is adapted to wedge into the first restriction slot and the second restriction slot. When the device magnetic element 19 nears the restriction unit 5, the device magnetic element 19 attracts the unit magnetic element 53 to move the restriction unit 5 to the second unit position (FIG. 4B). The first restriction slot 51 and the second restriction slot 41 therefore are adapted to be separated from the positioning hook 41, and the elastic force pushes the module substrate 2 back into the first substrate position (FIG. 2A).

With reference to FIGS. 2A, 2B, 2C, 4A and 4B, in one embodiment, the module substrate 2 is moved between the first substrate positon and the second substrate position in a first direction X. The restriction unit 5 is moved between the first unit position and the second unit position in a second direction Z, and the first direction X is perpendicular to the second direction Z.

With reference to FIGS. 2A, 2B and 2C, in one embodiment, the bracket 4 comprises at least one elastic arm 42. The device housing 1 comprises a track 13. The elastic arm 42 abuts the track 13. Utilizing the elastic arm 42, when the module substrate 2 is in the second substrate position or the third substrate position, the user can directly press the bracket 4 in the third direction Y. Therefore, the positioning hook 41 is separated from the first restriction slot or the second restriction slot. The elastic force then moves the module substrate 2 back into the first substrate position.

With reference to FIGS. 1A, 4A and 4B, in one embodiment, the electronic device E1 further comprises a first device member E11 and a second device member E12. The first device member E11 comprises a display E13 and the device housing 1. The second device member E12 comprises an input interface E14 and the device magnetic element 19. When the first device member E11 overlaps the second device member E12, the device magnetic element 19 is adjacent to the restriction unit 5.

Utilizing the electronic device of the first embodiment of the invention, when the module substrate is in the first substrate position (first state), the image-capturing element and the microphone are deactivated, and the user can identify the state (first state) of the electronic device via the first recognition label. In this state (first state), the image-capturing element and the microphone are deactivated by the switch unit, and therefore the image-capturing element and the microphone cannot be activated by malware. When the module substrate is in the third substrate position (third state), the image-capturing element and the microphone are activated, the image-capturing element is covered by the device housing, and only the microphone can receive sound. The user can identify the state (third state) of the electronic device via the second recognition label. When the module substrate is in the second substrate position (second state), the image-capturing element and the microphone are activated, the image-capturing element is aligned with the housing opening, the image-capturing element can catch image, and the microphone can receive sound. Therefore, the electronic device of the embodiment of the invention can prevent the image and sound from being leaked maliciously, and protect the privacy of the user.

Figure 5A:
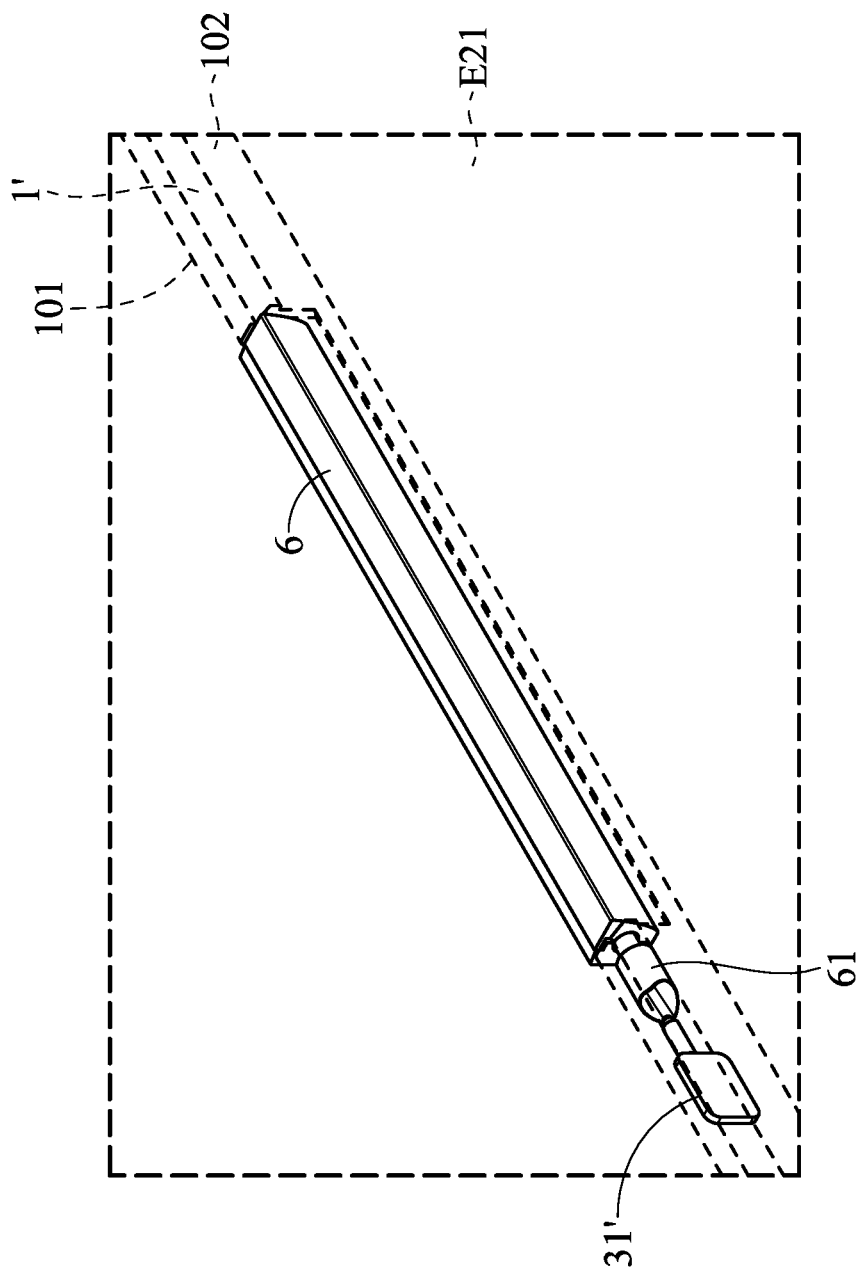
FIG. 5A shows an electronic device with an image-capturing function of a second embodiment of the invention, wherein the module body is in a first body orientation.
Figure 5B:
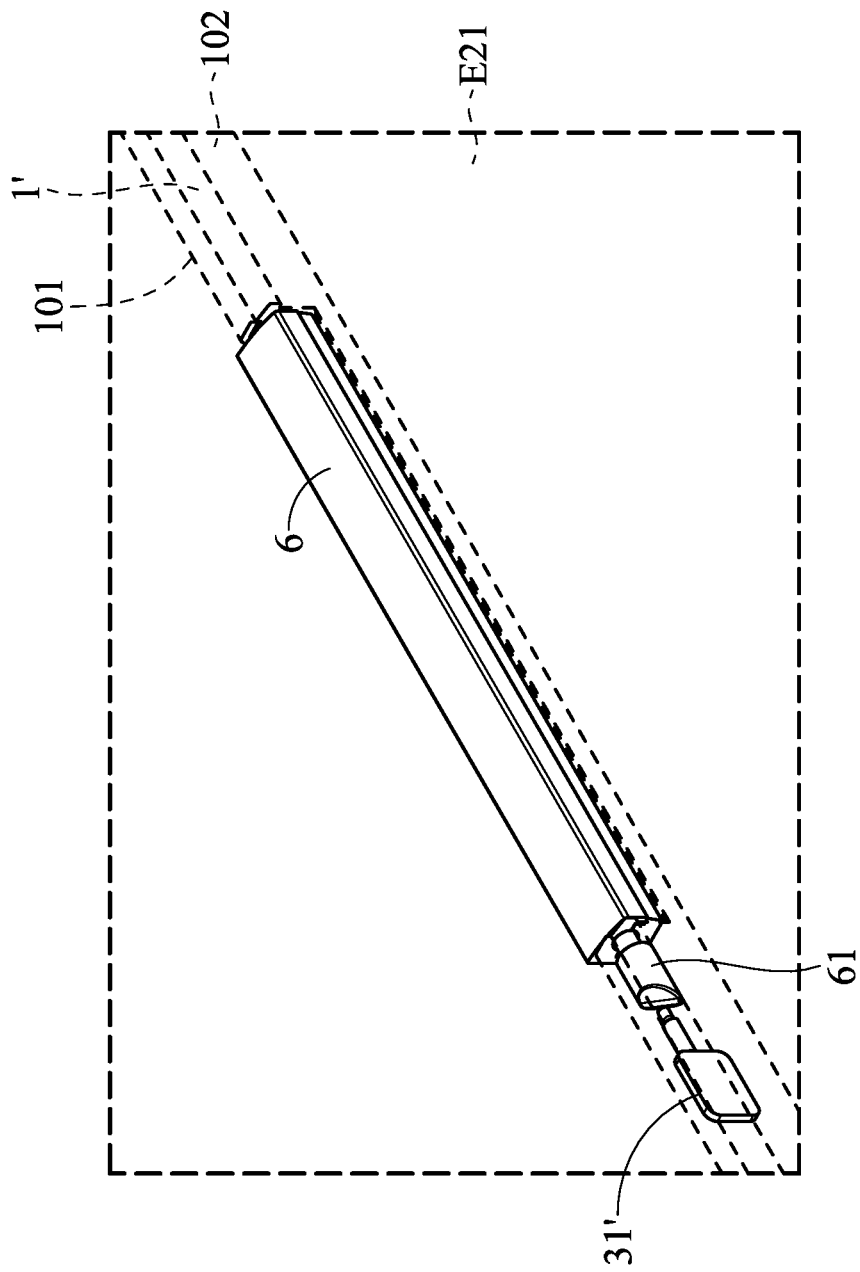
FIG. 5B shows the electronic device with image-capturing functionality of the second embodiment of the invention, wherein the module body is in a second body orientation.
Figure 5C:
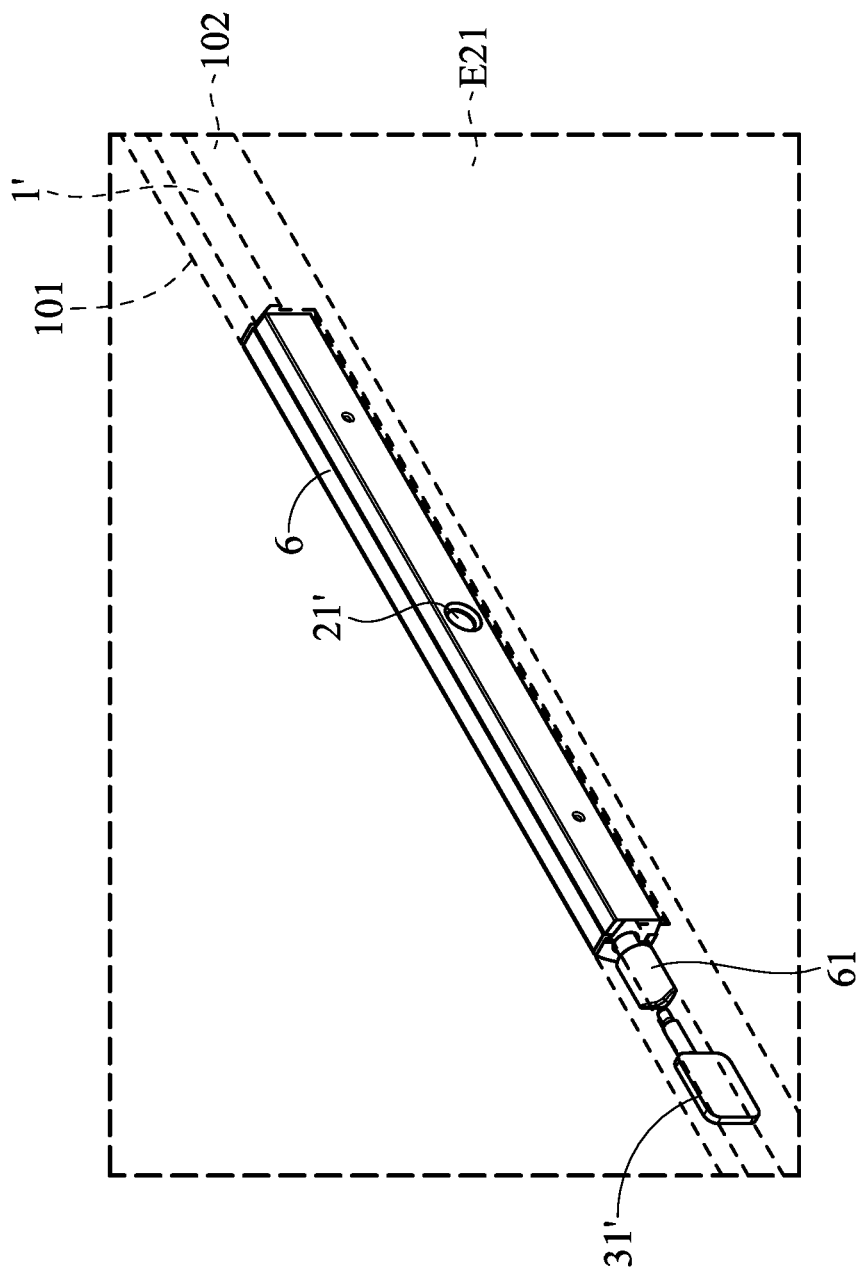
FIG. 5C shows the electronic device with an image-capturing function of the second embodiment of the invention, wherein the module body is in a third body orientation.
Figure 6:
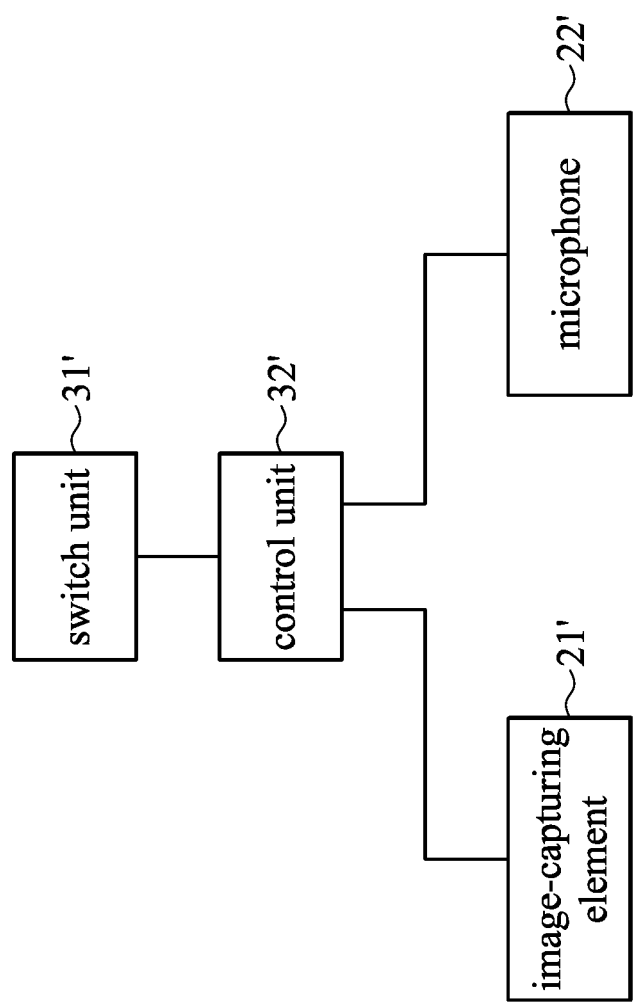
FIG. 6 is a block diagram of the electronic device of the second embodiment of the invention.

FIGS. 5A, 5B and 5C show an electronic device with image-capturing functionality of a second embodiment of the invention. FIG. 6 is a block diagram of the electronic device of the second embodiment of the invention. With reference to FIGS. 5A, 5B, 5C and 6, in the second embodiment, the electronic device E2 includes a device housing 1', a module body 6, an image-capturing element 21', a microphone 22', a switch unit 31' and a control unit 32'. The module body 6 is rotatably disposed on the device housing 1', wherein the module substrate 6 is adapted to be rotated between a first body orientation (FIG. 5A), a second body orientation (FIG. 5B) and a third body orientation (FIG. 5C). The image-capturing element 21' is disposed on the module body 6. The microphone 22' is disposed on the module body 6. The switch unit 31' is adapted to be pressed by the module body 6. The control unit 32' is coupled to the image-capturing element 21', the microphone 22' and the switch unit 31'. When the module body 6 is in the first body orientation (FIG. 5A), the switch unit 31' is activated, the switch unit 31' sends a pressed signal, and the control unit deactivates the image-capturing element 21' and the microphone 22' according to the pressed signal. When the module body 6 is in the second body orientation (FIG. 5B), the switch unit 31' is not activated, the control unit 32' activates the image-capturing element 21' and the microphone 22', and the image-capturing element 21' is covered by the device housing 1'. When the module body 6 is in the third body orientation (FIG. 5C), the switch unit 31' is not activated, the control unit 32' activates the image-capturing element 21' and the microphone 22', and the image-capturing element 21' is capable of capturing an image.

With reference to FIGS. 5A, 5B and 5C, in one embodiment, the module body 6 comprises a cam 61. The cam 61 is adapted to abut the switch unit 31'. When the module body 6 is in the first body orientation (FIG. 5A), the cam 61 activates the switch unit 31'. When the module body 6 is in the second body orientation (FIG. 5B) or the third body orientation (FIG. 5C), and the cam 61 does not activate the switch unit 31'.

With reference to FIGS. 5A, 5B and 5C, in one embodiment, the electronic device E2 further comprises a display E21. The device housing 1' comprises a first housing side 101 and a second housing side 102. The display E21 is disposed on the second housing side 102. When the module body 6 is in the first body orientation (FIG. 5A), the image-capturing element 21' is on the first housing side 101 (outward). When the module body 6 is in the second body orientation (FIG. 5B), the image-capturing element 21' faces the device housing 1' (downward). When the module body 6 is in the third body orientation (FIG. 5C), the image-capturing element 21' is on the second housing side 102 (facing the user).

Utilizing the electronic device of the second embodiment of the invention, when the module body is in the first body orientation (first state), the image-capturing element and the microphone are deactivated, and the user can identify the state (first state) of the electronic device via the orientation of the module body. In this state (first state), the image-capturing element and the microphone are deactivated by the switch unit, and therefore the image-capturing element and the microphone cannot be activated by malware. When the module body is in the second body orientation (second state), the image-capturing element and the microphone are activated, the image-capturing element is covered by the device housing, and only the microphone can receive sound. The user can identify the state (second state) of the electronic device via the orientation of the module body. When the module body is in the third body orientation (third state), the image-capturing element and the microphone are activated, the image-capturing element can catch image, and the microphone can receive sound. Therefore, the electronic device of the embodiment of the invention can prevent the image and sound from being leaked maliciously, and protect the privacy of the user.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device with an image-capturing function, comprising:
   a device housing, comprising a housing opening;
   a module substrate, slidably disposed in the device housing, wherein the module substrate is adapted to be slid between a first substrate position and a second substrate position;
   an image-capturing element, disposed on the module substrate and moved with the module substrate;
   a switch unit;
   a control unit, coupled to the image-capturing element and the switch unit, wherein when the module substrate is in the first substrate position, the switch unit is activated, the switch unit sends a pressed signal, and the control unit deactivates the image-capturing element according to the pressed signal, and when the module substrate is in the second substrate position, the switch unit is not activated, and the control unit activates the image-capturing element; and
   a microphone, wherein the microphone is disposed on the module substrate, the microphone is coupled to the control unit, and when the module substrate is in the first substrate position, the switch unit is activated, the switch unit sends the pressed signal, and the control unit deactivates the microphone according to the pressed signal, and when the module substrate is in the second substrate position, the switch unit is not activated, and the control unit activates the microphone.

2. The electronic device as claimed in claim 1, wherein when the module substrate is in the first substrate position, the image-capturing element is not aligned with the housing opening, and the image-capturing element is covered by the device housing, and when the module substrate is in the second substrate position, the image-capturing element is aligned with the housing opening and is capable of capturing an image.

3. The electronic device as claimed in claim 2, wherein the module substrate comprises a first recognition label, and when the module substrate is in the first substrate position, the first recognition label is aligned with the housing opening.

4. The electronic device as claimed in claim 2, wherein when the module substrate is moved to a third substrate position between the first substrate position and the second substrate position, the switch unit is not activated, the control unit activates the image-capturing element and the microphone, and the image-capturing element is not aligned with the housing opening and is covered by the device housing.

5. The electronic device as claimed in claim 4, wherein the module substrate comprises a second recognition label, and when the module substrate is in the third substrate position, the second recognition label is aligned with the housing opening.

6. The electronic device as claimed in claim 5, further comprising a bracket, wherein the module substrate is disposed on the bracket, when the module substrate is in the first substrate position, the switch unit is activated by the bracket, and when the module substrate is in the second substrate position or the third substrate position, the switch unit is not activated by the bracket.

7. The electronic device as claimed in claim 6, further comprising a restriction unit, wherein the restriction unit comprises a first restriction slot and a second restriction slot, the restriction unit is disposed on the device housing, the bracket comprises a positioning hook, and when the module substrate is in the third substrate position, the positioning hook wedges the first restriction slot, and when the module substrate is in the second substrate position, the positioning hook wedges the second restriction slot.

8. The electronic device as claimed in claim 7, further comprising a device magnetic element and an elastic element, wherein the restriction unit comprises a unit magnetic element, the elastic element is disposed on the device housing to exert an elastic force on the bracket, the device housing comprises a housing groove, the restriction unit is disposed in the housing groove and is adapted to be moved between a first unit position and a second unit position, and when the restriction unit is in the first unit position, the positioning hook is adapted to wedge into the first restriction slot or the second restriction slot, and when the device magnetic element nears the restriction unit, the device magnetic element attracts the unit magnetic element to move the restriction unit to the second unit position, the first restriction slot and the second restriction slot are adapted to be separated from the positioning hook, and the elastic force pushes the module substrate into the first substrate position.

9. The electronic device as claimed in claim 8, wherein the module substrate is moved between the first substrate position and the second substrate position in a first direction, the restriction unit is moved between the first unit position and the second unit position in a second direction, and the first direction is perpendicular to the second direction.

10. The electronic device as claimed in claim 9, wherein the bracket comprises at least one elastic arm, the device housing comprises a track, and the elastic arm abuts the track.

11. The electronic device as claimed in claim 9, further comprising a first device member and a second device member, wherein the first device member comprises a display and the device housing, the second device member comprises an input interface and the device magnetic element, and when the first device member overlaps the second device member, the device magnetic element is adjacent to the restriction unit.

12. An electronic device with an image-capturing function, comprising:
a device housing;
a module body, rotatably disposed on the device housing, wherein the module substrate is adapted to be rotated between a first body orientation, a second body orientation and a third body orientation;
an image-capturing element, disposed on the module body;
a microphone, disposed on the module body;
a switch unit, adapted to be pressed by the module body; and
a control unit, coupled to the image-capturing element, the microphone, and the switch unit, wherein when the module body is in the first body orientation, the switch unit is activated, the switch unit sends a pressed signal, and the control unit deactivates the image-capturing element and the microphone according to the pressed signal, and when the module body is in the second body orientation, the switch unit is not activated, the control unit activates the image-capturing element and the microphone, and the image-capturing element is covered by the device housing, and when the module body is in the third body orientation, the switch unit is not activated, the control unit activates the image-capturing element and the microphone, and the image-capturing element is capable of capturing an image.

13. The electronic device as claimed in claim 12, wherein the module body comprises a cam, the cam is adapted to abut the switch unit, and when the module body is in the first body orientation, the cam activates the switch unit, and when the module body is in the second body orientation or the third body orientation, the cam does not activate the switch unit.

14. The electronic device as claimed in claim 13, further comprising a display, wherein the device housing comprises a first housing side and a second housing side, the display is disposed on the second housing side, and when the module body is in the first body orientation, the image-capturing element is on the first housing side, and when the module body is in the second body orientation, the image-capturing element faces the device housing, and when the module body is in the third body orientation, the image-capturing element is on the second housing side.

* * * * *